UNITED STATES PATENT OFFICE.

REINHOLD GRÜTER, OF CHARLOTTENBURG, GERMANY, ASSIGNOR TO CHEMISCHE WERKE VORM. DR. HEINRICH BYK, OF CHARLOTTENBURG, GERMANY, A CORPORATION OF GERMANY.

THEOPHYLLIN COMPOUND.

No. 919,161.  Specification of Letters Patent.  Patented April 20, 1909.

Application filed August 20, 1908. Serial No. 449,502. (Specimens.)

*To all whom it may concern:*

Be it known that I, REINHOLD GRÜTER, a subject of the German Emperor, residing at Charlottenburg, Germany, have invented a certain new and useful Theophyllin Compound, of which the following is a specification.

Theophyllin, a therapeutically valuable product, is so difficult of absorption by the human organism, that it has already been attempted to convert this base into soluble double-compounds. Such compounds are for instance the well-known double salts consisting of the sodium salt of theophyllin on the one hand and sodium-salts of carboxylic acids on the other hand. Owing to the strongly pronounced hydrolytic properties of the sodium-salt of theophyllin, the double salts have, however, a strongly alkaline reaction. This defect has induced me to search for compounds with weaker bases, the principal object being, to produce compounds which may be applied by subcutaneous injection, a method of application which is new for diuretics. A subcutaneous diuretic should however not produce irritation, and should therefore not be strongly alkaline like the compounds already known. Moreover, a subcutaneous remedy which must be administered in the quantities necessary in case of theophyllin, should be easily soluble in water, in order that the required dose may be introduced in a few cubic centimeters. I have discovered, that theophyllin forms with the primary and secondary aliphatic diamins compounds which answer all these requirements, the said material being used in the proportion of one molecule of theophyllin to one molecule of the aliphatic amin. That theophyllin forms such permanent compounds in a solid crystalline form, could not be expected, especially as theobromin, which is isomeric with theophyllin and generally forms similar double salts, does not form analogous compounds, and as theophyllin itself does not act on aromatic amins, nor does it combine with tertiary aliphatic amins, and the heterocyclic antipyrin does not combine with theophyllin.

For producing the new compounds, the components are caused to act upon each other undiluted or after having been dissolved in a suitable solvent. The desired compounds may then be obtained in a solid form by evaporation of the liquid, preferably in vacuo at ordinary temperature. According to the nature of the diamins, the desired compounds may be obtained also with a slightly smaller quantity of diamin, than that corresponding to one molecule, as mentioned above. The desired compounds may be produced also by mutual decomposition of salts, such as sodium-theophyllin and hydrochlorids of diamins.

*Examples.*

I. 194 grams of crystallized piperazin are melted on a water-bath and then 198 grams of theophyllin introduced into the same with the aid of stirring. The latter thereby enters into solution, and the new product separates out in a crystallized form. It may then be dried, preferably over caustic lime at ordinary or slightly reduced pressure The equation illustrating the process of this example is as follows:

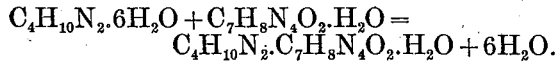

II. 198 grams of theophyllin are dissolved with a 10 per cent. solution of ethylene diamin corresponding in quantity to 46 grams of anhydrous diamin, and the solution is evaporated over caustic soda in a vacuum of 40 centimeters; the product crystallizes out gradually and completely; its solubility in water is upward of 30 per cent.

The equation illustrating the process of this example is as follows:

III. 116 grams of hexamethylene diamin or 102 grams of pentamethylene-diamin or 88 grams of tetramethylene diamin in aqueous solution are heated with 198 grams of theophyllin and digested until solution has taken place, after which the new products are evaporated over a drying agent, so as to form crystals.

The equation illustrating the process of this example is as follows:

The new compounds are white, very soluble in cold and hot water. The solubility in water is about 40 per cent. In alcohol and ether they are less soluble. They have no well-defined melting point, because on heating they are split up into their components. They are decomposed by strong and weak acids, even carbonic acid. If, for instance, carbonic acid or air containing carbonic acid is conducted through a solution of such compounds, free theophyllin separates out in the shape of needles characteristic of theophyllin. The new compounds have diuretic properties.

What I claim is:—

1. The process for the manufacture of easily soluble double compounds of theophyllin and aliphatic diamins, which consists in causing the said aliphatic diamins and theophyllin to interact in molecular proportions, substantially as described.

2. The process for the manufacture of easily soluble double compounds of theophyllin and aliphatic diamins, which consists in dissolving the theophyllin in the liquid diamin in molecular proportions and drying the product over a drying substance, substantially as described.

3. The process for the manufacture of easily soluble double compounds of theophyllin and aliphatic diamins, which consists in dissolving the theophyllin in an aqueous solution of the said diamin and evaporating the solution *in vacuo* over a drying substance, substantially as described.

4. The herein described new double compounds of theophyllin with aliphatic diamins, the said compounds forming white crystals, very soluble in water, less soluble in alcohol and ether, capable of being decomposed by acids, while yielding theophyllin, split up into their components by heating, and having diuretic properties.

In witness whereof I have set my hand hereunto in the presence of two subscribing witnesses.

REINHOLD GRÜTER.

Witnesses:
PAUL SCHULTZE,
MAX MAETSCHKE.